United States Patent
Im

(10) Patent No.: US 9,515,424 B2
(45) Date of Patent: Dec. 6, 2016

(54) PORTABLE CHARGER

(71) Applicant: LSIS CO., LTD., Anyang-si, Gyeonggi-do (KR)

(72) Inventor: Chang Jun Im, Asan-si (KR)

(73) Assignee: LSIS CO., LTD., Anyang-si (KR)

( * ) Notice: Subject to any disclaimer, the term of this patent is extended or adjusted under 35 U.S.C. 154(b) by 193 days.

(21) Appl. No.: 14/307,046

(22) Filed: Jun. 17, 2014

(65) Prior Publication Data

US 2015/0024632 A1   Jan. 22, 2015

(30) Foreign Application Priority Data

Jul. 22, 2013   (KR) .................. 10-2013-0086240

(51) Int. Cl.
| | | |
|---|---|---|
| *H02J 7/00* | (2006.01) | |
| *H01R 13/70* | (2006.01) | |
| *B60L 11/18* | (2006.01) | |
| *B60L 3/00* | (2006.01) | |

(52) U.S. Cl.
CPC ................. *H01R 13/70* (2013.01); *B60L 3/00* (2013.01); *B60L 3/0069* (2013.01); *B60L 11/1818* (2013.01); *B60L 11/1824* (2013.01); *B60L 2210/30* (2013.01); *B60L 2230/12* (2013.01); *B60L 2250/12* (2013.01); *Y02T 10/7005* (2013.01); *Y02T 10/7072* (2013.01); *Y02T 90/121* (2013.01); *Y02T 90/14* (2013.01)

(58) Field of Classification Search
USPC ....................................................... 320/111
See application file for complete search history.

(56) References Cited

U.S. PATENT DOCUMENTS

2008/0007212 A1* 1/2008 Theytaz ................ H02J 7/0013
                                                              320/107
2008/0136262 A1* 6/2008 Hara ......................... H02J 1/08
                                                              307/80

(Continued)

FOREIGN PATENT DOCUMENTS

| AT | 508489 | 1/2011 |
|----|--------|--------|
| CN | 102858585 | 1/2013 |

(Continued)

OTHER PUBLICATIONS

European Patent Office Application Serial No. 14175511.6, Search Report dated Mar. 26, 2015, 10 pages.

(Continued)

*Primary Examiner* — Mohammed Alam
(74) *Attorney, Agent, or Firm* — Lee Hong Degerman Kang & Waimey

(57) ABSTRACT

Provided is a portable charger connected to a wall electric power source and configured to supply an electric power from the wall electric power source to a load. The portable charger includes a plug, an electric wire, a switch, a first detection unit, a second detection unit, and a control unit. The control unit is configured to supply an electric power through the electric wire to the load when the plug is plugged in the socket and to cut off the supply of the electric power flowing through the electric wire by controlling the switch on the basis of the user's approach that is detected by the first detection unit, and the tensile force that is detected by the second detection unit while the electric power is being supplied.

4 Claims, 6 Drawing Sheets

(56) References Cited

U.S. PATENT DOCUMENTS

| | | | |
|---|---|---|---|
| 2009/0021221 A1* | 1/2009 | Krauer | B60L 11/1875 320/153 |
| 2009/0108680 A1* | 4/2009 | Minemura | H02J 9/005 307/104 |
| 2010/0241299 A1* | 9/2010 | Ito | B60L 11/1818 701/22 |
| 2014/0002011 A1* | 1/2014 | Ang | B60L 11/1838 320/107 |
| 2014/0111158 A1* | 4/2014 | Kinomura | H02G 3/0493 320/109 |

FOREIGN PATENT DOCUMENTS

| | | |
|---|---|---|
| DE | 10-2009-030092 | 12/2010 |
| DE | 20-2009-013675 | 4/2011 |
| DE | 10-2011-050998 | 6/2012 |
| EP | 2559588 | 2/2013 |
| JP | 05-276675 | 10/1993 |
| JP | 09-106861 | 4/1997 |
| JP | 2010-161910 | 7/2010 |
| JP | 2010-263667 | 11/2010 |
| JP | 2011-187175 | 9/2011 |
| JP | 2012-169176 | 9/2012 |
| JP | 2013-132169 | 7/2013 |
| KR | 10-2011-0053046 | 5/2011 |

OTHER PUBLICATIONS

Japan Patent Office Application Serial No. 2014-134847, Office Action dated Mar. 16, 2015, 3 pages.

Korean Intellectual Property Office Application Serial No. 10-2013-0086240, Office Action dated Aug. 11, 2016, 4 pages.

The State Intellectual Property Office of the People's Republic of China Application Serial No. 201410350584.5, Office Action dated Jan. 11, 2016, 6 pages.

* cited by examiner (a)

(b)

(c)

PORTABLE CHARGER

CROSS-REFERENCE TO RELATED APPLICATIONS

Pursuant to 35 U.S.C. §119(a), this application claims the benefit of earlier filing date and right of priority to Korean Patent Application No. 10-2013-0086240, filed on Jul. 22, 2013, the contents of which are all hereby incorporated by reference herein in its entirety.

BACKGROUND

The present disclosure relates to a portable charger.

A charge circuit interrupting device (CCID) is a portable device configured to supply electric power to an electric vehicle and includes a relay, a main board, etc.

The CCID is a device configured to supply electric power to an electric vehicle which is operatively connected on the basis of an opening and closing operation of the relay.

FIG. 1 is a view illustrating a related art CCID.

Referring to FIG. 1, the CCID includes a plug 11 which is plugged in a socket (wall electric power source) when in use, an electric wire 12 which connects the plug 11 and an electric vehicle, and an electric power switch 13 which is installed at a predetermined distance from the electric wire 12 and is switched on or off through manual operation so that the supply of the current flowing along the electric wire is connected or disconnected.

The CCID equipped with the electric power switch 13 has a structure in which the electric power switch is installed at a predetermined distance from the electric wire electrically connected to the plug and allows a current flow to be continued or discontinued, so the current flowing along an electric power cord is not supplied to an electric vehicle even in a state that the plug is still plugged in the socket, for which a user may be protected safely.

In the above described CCID, a user frequently plugs in or unplugs from the socket on the wall, so the user may be exposed to a certain accident due to the user's mistake.

Particularly, if the plug is unplugged from the wall electric power source while the electric vehicle is being electrically charged, arc-based flame may occur due to a high level current, which may lead to another accident.

SUMMARY

Embodiments provide an electrical safety device for a portable charger configured to detect a situation that a plug is unplugged from a wall electric power source due to a user's intentional or mistake in the middle of a charging operation, thus cutting off the current flowing along a portable charger.

The technical objects to be implemented by the embodiments are not limited to the above disclosed objects. Other technical objects not mentioned herein will be clearly understood by those skilled in the art to which the following embodiments belong.

In one embodiment, a portable charger that is connected to a wall electric power source and is configured to supply an electric power from the wall electric power source to a predetermined load, includes a plug that is inserted in a socket installed in the wall electric power source; an electric wire that connects the plug and the load and supplies an electric power of the wall electric power source to the load; a switch that is installed between the plug and the electric wire and switches on or off the supply of the electric power that flows along the electric wire; a first detection unit that is configured to detect whether a person approaches; a second detection unit that is arranged in the electric wire and is configured to detect a tensile force generating in the electric wire; and a control unit that is configured to supply an electric power through the electric wire to the load when the plug is plugged in the socket and that shuts on or off the supply of the electric power that flows along the electric wire by controlling the switch on the basis of a user's approach that is detected by the first detection unit in a state that the electric power is being supplied, and a tensile force that is detected by the second detection unit.

Also, the first detection unit may include either a pressure switch that is disposed in the plug and that is configured to switch in accordance with a pressure generating based on the grasping of the plug or a touch sensor that is disposed in the plug and that is configured to detect the touching of an external object that occurs in the plug.

Also, the portable charger may further include a second detection unit which is arranged in the electric wire and configured to detect a tensile force applied to the electric wire.

Also, the second detection unit may include a strain gauge whose resistance value increases in accordance with a tensile force that occurs in the electric wire.

Also, the control unit may be configured to switch on the switch when at least one condition among a condition that the plug is grasped, a condition that the plug is touched, and a condition that a tensile force over a certain level generates in the electric wire is satisfied.

In another embodiment, a portable charger which is connected to a wall electric power source and is configured to supply an electric power from the wall electric power source to a load, includes a plug which is inserted in a socket installed in the wall electric power source; an electric wire which connects the plug and the load to supply an electric power from the wall electric power source to the load; a strain gauge which is installed around the electric wire and of which a resistance value varies with a tensile force applied to the electric wire; a switch disposed between the plug and the electric wire to allow the supply of an electric power flowing through the electric wire to be continued or discontinued; and a control unit which supplies electric power to the load through the electric wire when the plug is plugged in the socket and which controls the switch to cut off the electric power flowing through the electric wire when the resistance value of the strain gauge is over a preset reference value.

There may be further provided either a pressure switch that is installed in the plug and that is switched on or off in accordance with a pressure generating based on the grasping of the plug or a touch sensor that is installed in the plug and that is configured to detect the touching of an external object generating in the plug.

Also, the control unit may be configured to switch on the switch when at least one condition among a condition that the plug is grasped, a condition that the plug is touched, and a condition that a tensile force over a certain level generates in the electric wire is satisfied.

According to the embodiments, a situation that the plug is unplugged from the wall electric power source may be previously recognized by detecting the grasping of the plug or the pulling of the electric wire. When the unplugging is detected, the current from the wall electric power source is cut off, thus preventing a damage caused by the abnormal unplugging of the plug.

DETAILED DESCRIPTION OF THE EMBODIMENTS

Reference will now be made in detail to the embodiments of the present disclosure. It will be understood that a person having an ordinary skill in the art may invent a variety of devices included in the concepts and scope of the embodiments. In addition, examples of which are illustrated in the accompanying drawings. The terminology used herein is for the purpose of describing particular embodiments only and is not intended to be limiting of the embodiments.

In addition, it should be understood that the principles, viewpoints of the embodiments and all the descriptions described through the embodiments as well as specified embodiments are intended to include all the matters related to structural and functional equivalents. In addition, it should be also understood that such equivalents will include all the currently known equivalents as well as the to-be-developed equivalents, i.e., all the elements that will be invented to perform the same function irrespective of their structures.

Figure 1:
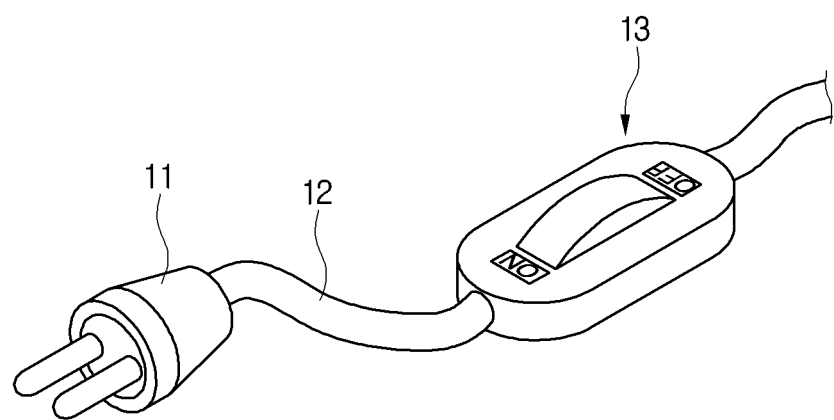
FIG. 1 is a view illustrating a related art CCID.
Figure 2:
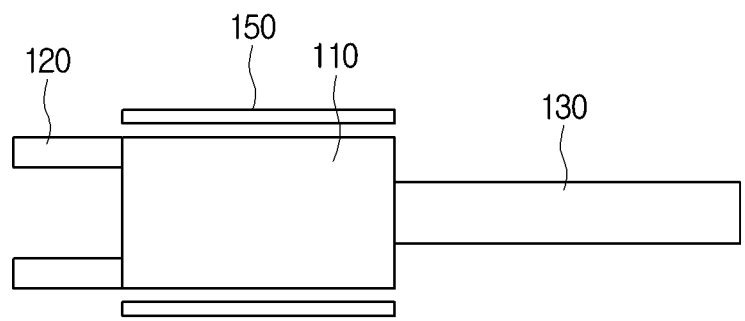
FIG. 2 is a view for describing an exterior of a portable charger according to a first embodiment.
Figure 3:
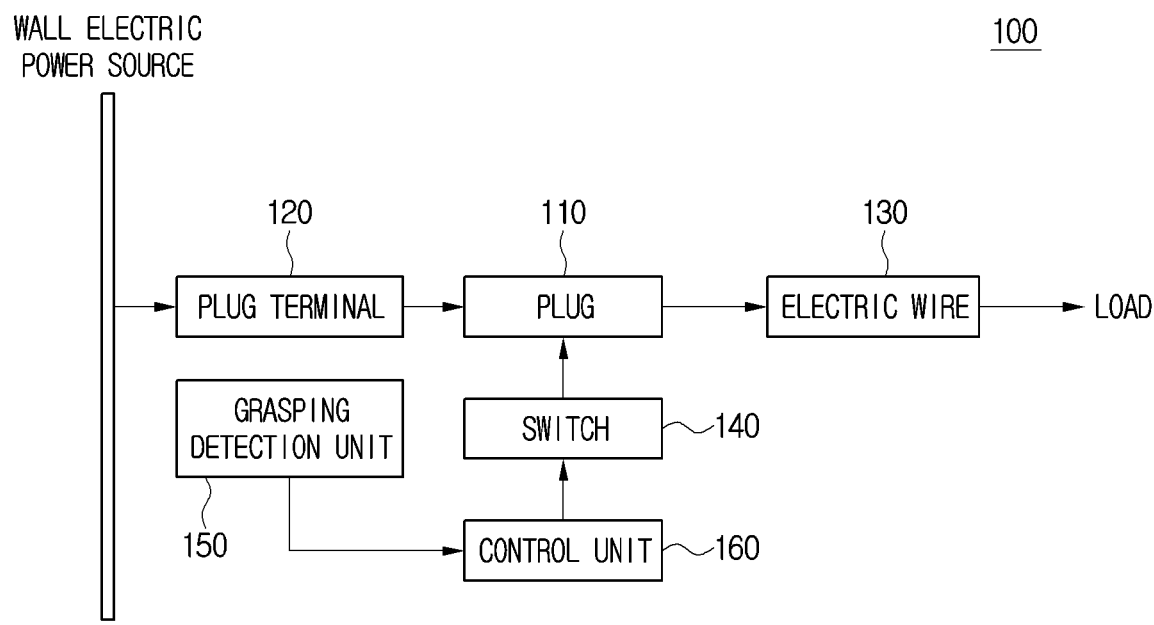
FIG. 3 is a block diagram of an inner construction of the portable charger in FIG. 2.

FIG. 2 is a view for describing an exterior of a portable charger according to a first embodiment. FIG. 3 is a block diagram of an inner construction of the portable charger in FIG. 2.

The portable charger according to the first embodiment will be described hereinafter with reference to FIGS. 2 and 3.

Referring to FIGS. 2 and 3, the portable charger 100 includes a plug 110, a plug terminal 120, an electric wire 130, a switch 140, a grasping detection unit 150 and a control unit 160.

In the portable charger, the plug 110 is a case which contours an exterior of an electric power plug which is connected to a wall electric power source.

At one side of the plug 110, a plug terminal 120 which extends in a longitudinal direction of the plug is provided.

The plug terminal 120 is a portion substantially inserted into the wall electric power source (socket) and thus may include a plurality of terminals corresponding to the configuration of the wall electric power source.

For example, the plug terminal 120 may include a positive terminal configured to receive a positive (+) electric power, and a negative terminal configured to receive a negative (−) electric power.

Grasping the plug 110, a user inserts the plug terminal 120 in the wall electric power source, so a preparation for supplying electric power to a load connected to the portable charger may be finished.

The electric wire 130 serves to transfer an electric power inputted through the plug terminal 120 to the load connected to a next unit. It is preferred that the electric wire 130 is a coated electric wire and it may also be called an electric power transfer unit because of its transfer function.

The switch 140 may be installed between the plug terminal 120 and the electric wire 130, or at a portion of the electric wire 130.

The switch 140 may be installed between the plug terminal 120 and the electric wire 130 thereby cutting off the electric power received through the plug terminal 120, to the load through the electric wire 130.

The grasping detection unit 150 detects a state that an outside user approaches the portable charger 100.

The grasping detection unit 150 may detect a state that the outside user grasps the plug 110. More specifically, the grasping detection unit 150 detects a state that the plug 110 is unplugged from the wall electric power source while the electric power is being supplied to the load.

The grasping detection unit 150 may include a pressure switch.

More specifically, the grasping detection unit 150 may detect a grasping pressure when the user grasps the plug 110 so as to unplug the plug 110 from the wall electric power source, and generate an electric signal based on the detected pressure.

The grasping detection unit 150 includes the pressure switch, and thus, when the user grasps the plug 110, the switch is closed to allow the gasping detection unit 150 to generate an electric signal.

In addition, the grasping detection unit 150 may include a touch sensor.

When the user touches the plug 110, the grasping detection unit 150 detects the touch and accordingly generates a predetermined signal based on the detected touch.

The control unit 160 controls an overall operation of the portable charger 100.

When the plug 110 is plugged in the wall electric power source (preferably, when the plug terminal 120 is inserted in the socket of the wall electric power source), the control unit 160 determines whether the load is electrically connected to the end portion of the portable charger 100. Here, the load may be a variety of devices. It is assumed in the embodiments that the load is an electrical vehicle.

When the one end (preferably, the plug terminal) of the portable charger is electrically connected to the wall electric terminal, and the other end of the same is electrically connected to the load, the control unit 160 controls the switch 140, so the electric power supplied from the wall electric power source is supplied along the electric wire 130 to the load.

At this time, while the electric power is being supplied to the load, the control unit 160 periodically checks a signal which is outputted through the grasping detection unit 150.

More specifically, while the electric power is being supplied to the load, the control unit 160 detects whether the user has grasped the plug 110.

Thereafter, when a grasping detection signal is outputted from the grasping detection unit 150, the control unit 160 controls the switch 140 to allow the electric power supplied to the load to be cut off.

In other words, when receiving a detection signal indicating that the user approaches the portable charger and touches the plug 110 or indicating that the plug 110 is grasped for unplugging the plug 110 from the wall electric power source, the control unit 160 controls the switch 140 to be opened, thus cutting off the electric power flowing through the electric wire 130.

The portable charger according to the first embodiment is characterized in that the grasping state of the pug 110 is detected to previously detect whether the plug 110 is unplugged from the wall electric power source, and accordingly, when the unplugging is detected, the current supplied to the load is cut off, thus preventing a damage caused by the abnormal unplugging of the plug 110.

Figure 4:
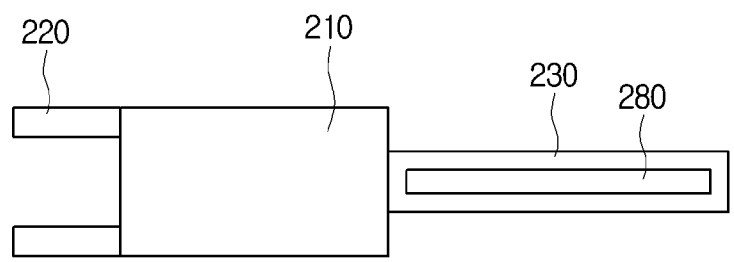
FIG. 4 is a view for describing an exterior of a portable charger according to a second embodiment.
Figure 5:
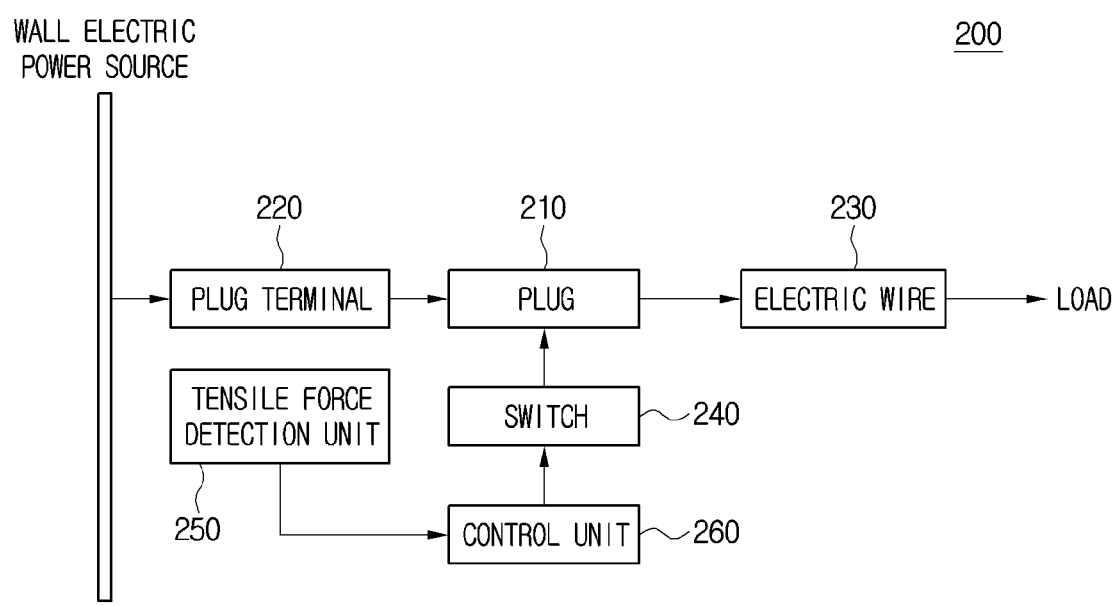
FIG. 5 is a block diagram of an inner construction of the portable charger in FIG. 4.
Figure 6:
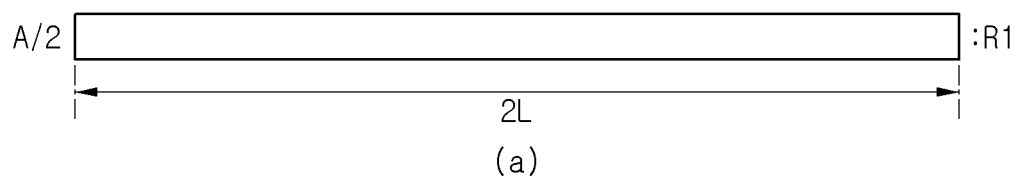
FIG. 6 is a view for describing the principle of a tensile force detection unit illustrated in FIG. 5.
Figure 6:
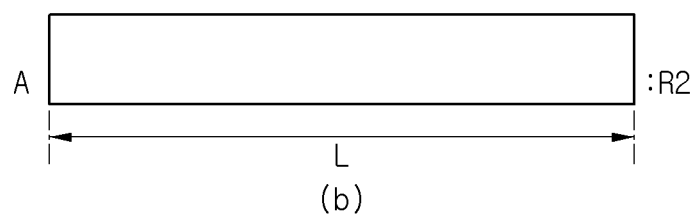
Figure 6:
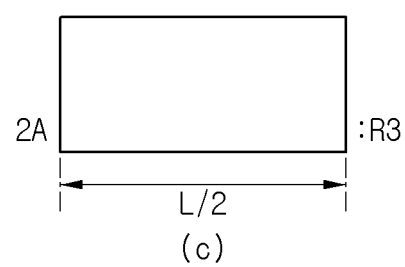

FIG. 4 is a view for describing an exterior of a portable charger according to a second embodiment. FIG. 5 is a block diagram of an inner construction of the portable charger in FIG. 4. FIG. 6 is a view for describing the principle of a tensile force detection unit illustrated in FIG. 5.

The portable charger according to the second embodiment will be described hereinafter with reference to FIGS. 4 to 6.

Referring to FIGS. 4 to 6, the portable charger 200 includes a plug 210, a plug terminal 220, an electric wire 230, a switch 240, a tensile force detection unit 250, and a control unit 260.

In the portable charger, the plug 210 is a case which contours an exterior of an electric power plug which is connected to a wall electric power source.

At one side of the plug 210, a plug terminal 220 which extends in a longitudinal direction of the plug is provided.

The plug terminal 220 is a portion substantially inserted into the wall electric power source (socket) and thus may include a plurality of terminals corresponding to the configuration of the wall electric power source.

For example, the plug terminal 220 may include a positive terminal configured to receive a positive (+) electric power, and a negative terminal configured to receive a negative (−) electric power.

Grasping the plug 210, a user inserts the plug terminal 220 in the wall electric power source, so a preparation for supplying electric power to a load connected to the portable charger may be finished.

The electric wire 230 serves to transfer an electric power inputted through the plug terminal 220 to the load connected to a next unit. It is preferred that the electric wire 230 is a coated electric wire and it may also be called an electric power transfer unit because of its transfer function.

Here, the switch 240 may be installed between the plug terminal 220 and the electric wire 230 or at a portion of the electric wire 230. The switch 240 may be installed between the plug terminal 220 and the electric wire 230, thus cutting off the electric power which is inputted through the plug terminal 220, to the load through the electric wire 230.

The tensile force detection unit 250 to detects whether an outside user pulls the electric wire of the portable charger 200.

The tensile force detection unit 250 detects whether a tensile force is being applied to the electric wire 230 so as to unplug the plug 110 from the wall electric power source, while the outside user is grasping the electric wire 230.

The tensile force detection unit 250 may include a strain gauge.

More specifically, the tensile force detection unit 250 may include a strain gauge which is attached on a surface of a structure so as to measure a deformation state and degree of the structure.

The strain gauge will be described in brief below.

Before the strain gauge is described in details, the term 'strain' will be described first. The stain represents a deformation degree or deformation rate, and is expressed in the form of a ratio of an increased or decreased length of an object to an original length of the object when a tensile or compressive force is applied to the object. Thus, the strain has no unit, but may be expressed in the unit of cm/cm, mm/mm, etc. The strain is a technical terminology that is used when it needs to express a certain deformation in a structure when a force is externally applied to the structure in the field of analysis and design of structures or mechanical elements such as civil engineering, mechanical engineering, architecture engineering, aeronautical engineering, and marine engineering.

The stain gauge may be classified into two types, i.e., an electrical strain gauge which measures a strain electrically, and a mechanical strain gauge which measures a strain mechanically.

The electrical strain gauge measures a deformation rate on the basis of a change in electric resistance of a stain gauge attached to a structure when the structure deforms, while the mechanical gauge measures a deformation rate of a structure by mechanically measuring a slight change in distance between two points. The development of the strain gauge makes it possible to precisely measure a deformation state of a structure. Resultantly, it is possible to know a stress using the measured deformation rate.

Here, the strain gauge may have different shape and length depending on the material of a structure. A 5 mm long gauge is generally used for a metallic material or a steel material. A 30 to 100 mm long gauge is generally used for a concrete material. In addition, there is not only an attachment type gauge which is attached on a surface of a structure but also a buried-type strain gauge which is buried in the structure when the object or structure is manufactured.

In the present embodiment, the electrical strain gauge is used to detect the tensile force which is applied to the electrical wire 130.

Referring to FIG. 6, the strain gauge includes a resistor. The resistor becomes thinner and longer when receiving the tensile force. As the resistor becomes thinner and longer, the resistance value "R" of the resistor increases. The tensile force applied to an object may be measured on the basis of the above-described principle.

For example, in a normal state, the resistor has a cross sectional area of "2A", a length of "L/2", and a resistance value of "R3".

In this state, when a tensile force is applied to the resistor, the cross sectional area of the resistor decreases to "A", and the length increases to "L". At this time, the resistance value "R2" of the resistor is higher than the resistance value of "R3".

When a greater tensile force is applied to the resistor, the cross sectional area of the resistor decreases to "A/2", and the length increases to "2L". At this time, the resistance value "R1" of the resistor is higher than the resistance values "R2" and "R3".

The above-described principles may be defined by the following formula 1.

$$R = \rho \frac{L}{A} \qquad \text{[Formula 1]}$$

where R represents a resistance value,
ρ represents a specific resistance,
L represents the length of a resistor, and
A represents the cross sectional area of a resistor.

According to the formula 1, the resistor increases in length but decreases in cross sectional area as the tensile force is applied, and thus the resistance value increases.

The control unit 260 controls an overall operation of the potable charger 200.

First of all, the control unit 260 determines whether the load is connected to an end of the portable charger 200 when the plug 210 is plugged in the wall electric power source (preferably, when the plug terminal 220 is inserted into the socket of the wall electric power source). Here, the load may be a variety of devices. It is assumed in the embodiments that the load is an electrical vehicle.

When the one end (preferably, the plug terminal) of the portable charger is electrically connected to the wall electric terminal, and the other end of the same is electrically connected to the load, the control unit 260 controls the switch 240, so the electric power supplied from the wall electric power source is supplied along the electric wire 230 to the load.

At this time, the control unit 260 periodically checks the state of the tensile force detection unit 250 while the electric power is being supplied to the load.

More specifically, the control unit 260 detects whether a user applies a tensile force to the electric wire 230 while the electric power is being supplied to the load.

Afterward, the control unit 260 confirms a resistance value based on the current state of the tensile force detection unit 250, and confirms the intensity of the tensile force applied to the electric wire 230 based on the confirmed resistance value.

The control unit 260 stores a reference resistance value, and the control unit 260 determines that a tensile force greater than a certain level was applied to the electric wire 230 when a resistance value of the tensile force detection unit 250 based on a change in state of the tensile force detection unit 250 becomes higher than the reference resistance value.

The control unit 260 cuts off the electric power to the load by controlling the switch 240, when a tensile force greater than a certain level is applied to the electric wire 230, that is, when the resistance value of the tensile force detection unit 250 becomes higher than the reference resistance value.

The control unit 260 cuts off the electric power along the electric wire 230 by controlling the switch 240 to be opened, when a user approaches the portable charger and pulls the electric wire 230 for the purpose of unplugging the plug 210 from the wall electric power source.

Although not described above, the tensile force detection unit 250 may be provided inside the electric wire 230. More specifically, the strain gauge of the tensile force detection unit 250 may be disposed in a sheath which surrounds the electric wire 230.

The portable charger according to the second embodiment is characterized in that it detects a tensile force applied to the electric wire 230 to previously detect a situation that the plug 210 is being unplugged from the wall electric power source. Accordingly, when the unplugging is detected, the current supplied to the load is cut off, thus preventing a damage caused by the abnormal unplugging of the plug 210.

Figure 7:
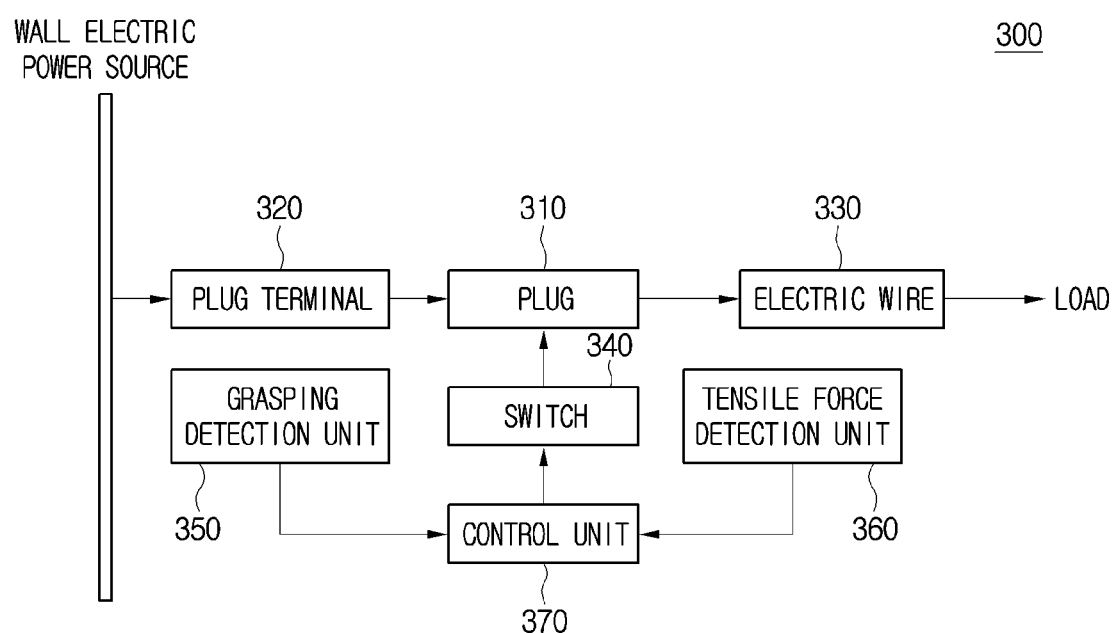
FIG. 7 is a block diagram illustrating an inner construction of a portable charger according to a third embodiment.

FIG. 7 is a block diagram illustrating an inner construction of a portable charger according to a third embodiment.

Referring to FIG. 7, the portable charger 30 includes a plug 310, a plug terminal 320, an electric wire 330, a switch 340, a grasping detection unit 350, a tensile force detection unit 360, and a control unit 370.

In the portable charger 300 of FIG. 7, the same elements as those previously described in connection with the portable chargers of FIGS. 3 to 5 will be omitted.

The portable charger 300 of FIG. 7 includes a grasping detection unit as illustrated in FIG. 3 and a tensile force detection unit as illustrated in FIG. 5.

The control unit 370 previously detects a situation that the plug 310 is being unplugged from the wall electric power source under an "OR" operational condition of the grasping detection unit 350 and the tensile force detection unit 360.

The control unit 370 cuts off the electric power to the load by switching the switch 340 to be opened, when receiving at least one signal between a grasping detection signal of the plug 310 detected by the grasping detection unit 350 and a detection signal which indicates that a tensile force greater than a certain level is applied to the electric wire 360 and which is detected by the tensile force detection unit 350.

Figure 8:
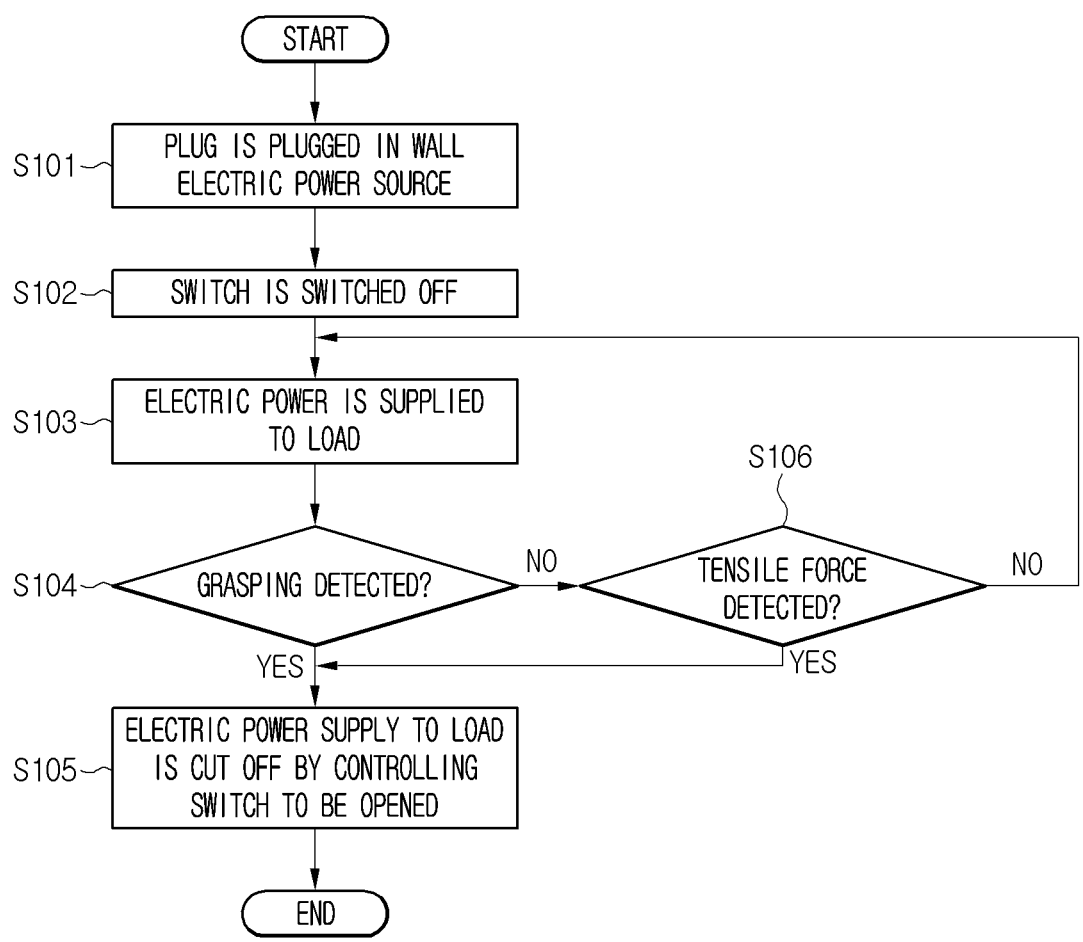
FIG. 8 is a flowchart for describing an operation method of a portable charger according to an embodiment.

FIG. 8 is a flowchart for describing an operation method of a portable charger according to an embodiment. The operation method of the portable charger will be described by exemplifying the portable charger of FIG. 7.

Referring to FIG. 8, in operation 101, a user plugs the plug 31 in the wall electric power source. That is, the user inserts the plug terminal 320 in the socket of the wall electric power source.

Afterward, in operations 102 and 103, the control unit 370 controls the switch 340 to be closed and allows the electric power supplied from the wall electric power source to be delivered to the load.

Next, in operation 104, the control unit 370 determines whether a detection signal indicating the grasping of the plug 310 is outputted through the grasping detection unit 350.

If it is determined in operation 104 that the detection signal indicating the grasping of the plug 310 is outputted, the control unit 370 controls the switch 340 to be opened, thus cutting off the electric power to the load in operation 105.

Meanwhile, if it is determined in operation 104 that the detection signal indicating the grasping of the plug 31 is not outputted, it is determined in operation 106 whether a tensile force greater than a certain level is applied.

Afterward, if it is determined in operation 106 that the tensile force greater than a certain level is applied, the routine goes to operation 105, and if not, it returns to operation 103.

According to the embodiments, a situation that the plug is unplugged from the wall electric power source may be previously recognized by detecting the grasping of the plug or the pulling of the electric wire. When the unplugging is detected, the current from the wall electric power source is cut off, thus preventing a damage caused by the abnormal unplugging of the plug.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A portable charger connected to a wall electric power source and configured to supply an electric power from the wall electric power source to a load, the portable charger comprising:
   a plug inserted in a socket that is installed in the wall electric power source;
   an electric wire connecting the plug and the load to supply an electric power from the wall electric power source to the load;
   a switch disposed between the plug and the electric wire;
   a first detection unit configured to detect a stress applied to the plug or a touch on the plug;
   a second detection unit disposed in the electric wire and configured to detect a variation of a tensile force applied to the electric wire; and
   a control unit configured to supply an electric power through the electric wire to the load when the plug is plugged in the socket and to allow the electric power supplied to the load to be cut off by controlling the switch based on the detected stress, the detected touch and the detected variation of the tensile force while the electric power is being supplied to the load.

2. The portable charger according to claim 1, wherein the first detection unit comprises at least one of a pressure switch and a touch sensor,
   wherein the pressure switch is disposed in the plug and performs a switch operation according to a pressure caused by grasping of the plug, and the touch sensor is disposed in the plug and detects whether an external object touches the plug.

3. The portable charger according to claim 1, wherein the second detection unit comprises a strain gauge of which a resistance value increases according to a tensile force applied to the electric wire.

4. The portable charger according to claim 1, wherein the control unit controls the switch to be opened when detecting at least one condition among a condition that the plug is grasped, a condition that the plug is touched, and a condition that a tensile force greater than a certain level is applied to the electric wire.

* * * * *